United States Patent

[11] 3,584,798

| [72] | Inventors | Lev Illarionovich Metreveli<br>FrunzensKaya nabereyhnoya 28 Kv. 118;<br>Vladimir Dmitrievich Zhukov, Ulitsa<br>Goncharova, 8/13, Kv. 24; Kornely<br>Leonovich Chimishkian, Leningradsky<br>prospekt, 19, kv. 35, all of U.S.S.R. |
|---|---|---|
| [21] | Appl. No. | 751,576 |
| [22] | Filed | Aug. 9, 1968 |
| [45] | Patented | June 15, 1971 |

[54] APPARATUS FOR PREPARING SUSPENSIONS OF BIOLOGICAL TISSUES, CELLS AND BACTERIA
2 Claims, 2 Drawing Figs.

| [52] | U.S. Cl. | 241/39 |
|---|---|---|
| [51] | Int. Cl. | B02c 19/06 |
| [50] | Field of Search | 241/39, 40, 2, 5, 1 |

[56] References Cited
UNITED STATES PATENTS

| 1,226,831 | 5/1917 | Walker | 241/39 |
| 1,234,697 | 7/1917 | Foote | 241/39 UX |
| 3,257,080 | 6/1966 | Snyder | 241/39 X |
| 3,458,139 | 7/1969 | Edebo | 241/39 X |
| 3,472,202 | 10/1969 | Webb | 241/39 X |

*Primary Examiner*—Donald G. Kelly
*Attorney*—Waters, Roditi, Schwartz & Nissen

ABSTRACT: A device is provided for preparing subcellular suspensions of biological tissues, cells and bacteria and comprises a high-pressure chamber which receives the material to be comminuted and is in communication with a source of gas under high pressure. A receiver for suspended product is disposed beneath the high-pressure chamber and communicates therewith via an outlet passageway of not less than 0.5 mm. in cross section and a spiral tube which is situated in the receiver. A valve is fitted in the passageway to close the same and open only when a predetermined pressure is built up in the chamber, whereupon the material is instantaneously extruded through the passageway and is comminuted while passing therethrough. The suspended product then passes into the spiral tube where it is separated from the gas. The valve may be in the form of a membrane which breaks under the predetermined pressure of the gas built up in the chamber. The pressure at which the membrane ruptures is not less than 50 atm.

PATENTED JUN15 1971
3,584,798
FIG.1
FIG.2
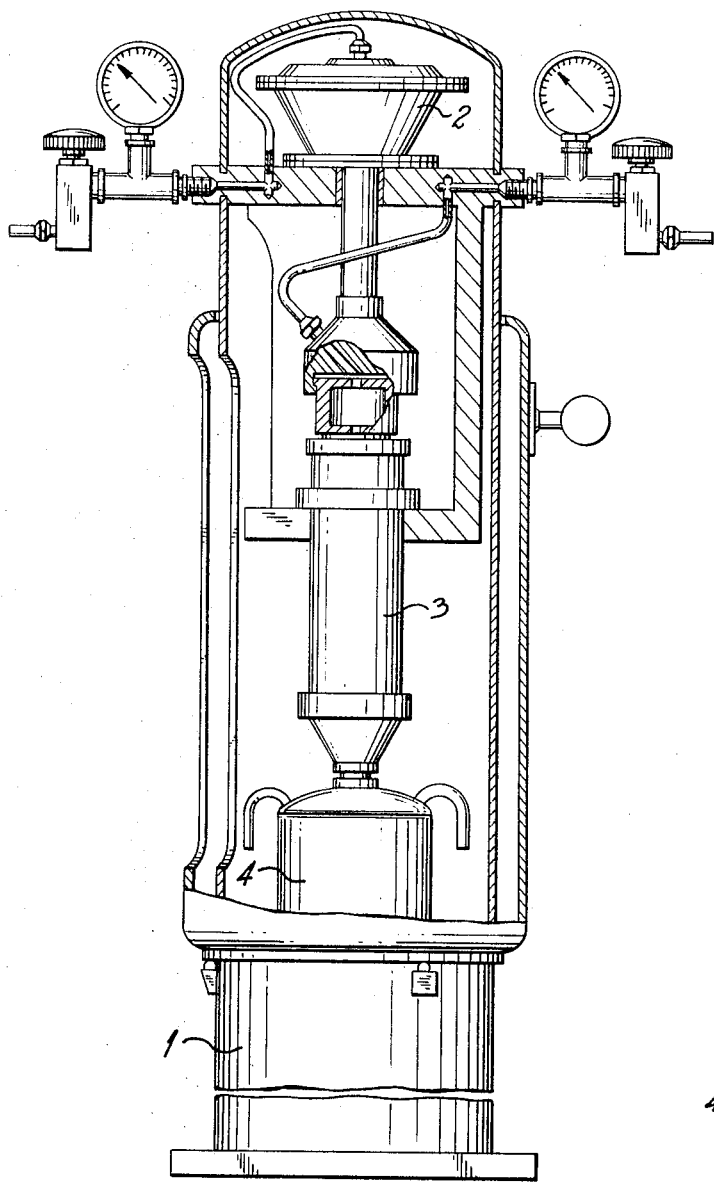
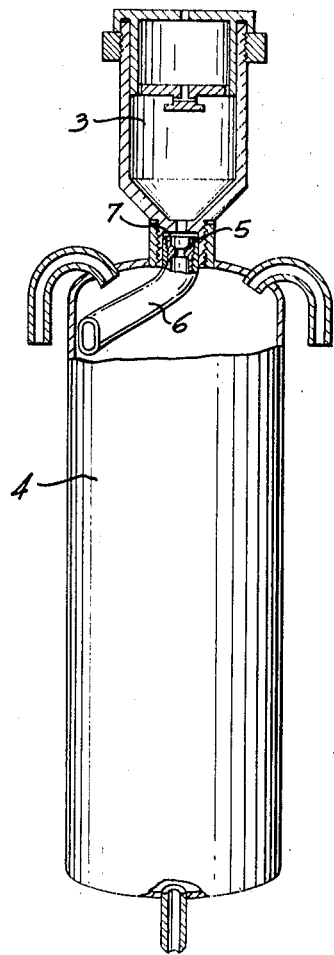

APPARATUS FOR PREPARING SUSPENSIONS OF BIOLOGICAL TISSUES, CELLS AND BACTERIA

The present invention relates to devices for preparing suspensions of biological tissues, cells and bacteria employed in the biological, chemicopharmaceutical and food industries.

Devices for preparing subcellular suspensions of biological tissues, cells and bacteria are known which are based on the action of force on the material to be comminuted: shaking with diverse hard particles, the action of ultrasonic oscillations, trituration between two surfaces and extrusion through narrow slits or canals.

A device for preparing subcellular suspensions of biological tissues, cells and bacteria is known, wherein the material to be comminuted is extruded through a narrow canal which is smaller than the cells of said material.

The material to be comminuted is placed in a cylindrical chamber under the plunger of a syringe provided at the bottom end with a narrow canal 10 microns in diameter and actuated by a hydraulic press exerting a pressure up to 50 tons. The chamber containing the material to be comminuted and the receiver for the product suspension are placed in a frame provided with a clamping device for holding the chamber. Under the pressure of the hydraulic press, the material is gradually extruded through the narrow canal into the receiver for product suspension.

Under such force a large amount of heat is evolved which inactivates and denatures the comminuted material. To avert this effect the material is first frozen and the device is cooled during operation.

Deficiencies of this device for implementing the same are the high content of entire cells in the suspension obtained, thermal inactivation and denaturation of the comminuted material, the difficulty of maintaining the sterility of the comminuted material and the low output of said device.

It is an object of the present invention to provide a device for preparing subcellular suspensions of biological tissues, cells and bacteria which ensures the preparation of suspensions with a high content of disrupted cells without thermal inactivation and denaturation of the comminuted material while maintaining sterility of said material and high output of said device.

The foregoing and other objects have been accomplished by the provision of a device for preparing subcellular suspension of biological tissues, cells and bacteria based on the action force on the material to be comminuted, wherein said material is placed in a chamber having an outlet canal of not less than 0.5 mm. in cross section and hermetically closed with a lock and into which gas is forced to a pressure of not less than 50 atm., whereupon the canal is opened so that the material is instantaneously extruded through said canal and is thereby comminuted. Apparently the material is comminuted by the friction resulting during the rapid flow of said material through the canal.

The device thus consists of a high-pressure chamber which can be closed hermetically into which the material to be comminuted is placed and which communicates with a source of gas under high pressure and has an outlet canal with a cross section of not less than 0.5 mm. leading to a receiver positioned under the high-pressure chamber. Said canal is provided with a lock opening under the pressure built up in the chamber and is connected to a spiral tube for separating the product suspension from the gas.

The lock closing the canal is preferably a membrane which is broken under the pressure built up in the chamber.

This solution of the problem enables the preparation of sterile subcellular suspensions of human and animal organs and tissues, and cultures of cells and bacteria with a high content of disrupted cells, thus giving a high yield of cell-free enzymes and viral cultures for the preparation of sera and vaccines.

For a better understanding of the present invention by those skilled in the art the following Example of the preparation of a subcellular suspension of sheep brain is given by way of illustration.

EXAMPLE 150 g. of sheep brain tissue is placed in the airtight highpressure chamber of the device for preparing subcellular suspensions of biological tissues, cells and bacteria. Into this chamber sterilized nitrogen is forced to a pressure of 70 atm. The membrane closing the outlet canal is thereby broken and the brain tissue is instantaneously extruded into the receiver. Under the action of centrifugal force in the spiral tube the heavier suspension is separated from the nitrogen.

Microscopic examination of the brain tissue suspension obtained demonstrates practically 100 per cent comminution of the cells.

A preferred embodiment of the present invention is illustrated in the accompanying drawings, wherein:

FIG. 1 is an elevation view partly broken away and in section of a device preparing subcellular suspension of biological tissues, cells and bacteria, according to the invention;

FIG. 2 is an elevation view partly broken away and in section of the high pressure chamber and the receiver for the product suspension.

The device consists of frame 1 (FIG. 1) with pneumatic clamping device 2, high-pressure chamber 3 and receiver 4 for product suspension.

High-pressure chamber 3 (FIG. 2) is provided with comminuting canal 5 joined to spiral tube 6 separating the product suspension from gas and situated in chamber 4 connected with chamber 3.

Canal 5 is closed by membrane 7.

Operation of the device consists in the following:

After sterilization of the communicating high-pressure chamber 3, receiver 4 for product suspension, spiral tube 6 and membrane 7, the material to be comminuted is placed in high-pressure chamber 3 whereupon said chamber with receiver 4 for product suspension is positioned in frame 1 and hermetically closed by means of pneumatic clamping device 2 after which gas is forced into high-pressure chamber 3 to the pressure required for the given material being comminuted.

Said pressure breaks membrane 7 and the compresses gas instantaneously extrudes the material to be comminuted through outlet canal 5 into receiver 4 for product suspension.

While passing through spiral tube 6 the product suspension is separated by centrifugal force from the gas and flows to the bottom of receiver 4.

We claim:

1. A device for preparing subcellular suspensions of biological tissues, cells and bacteria comprising a high-pressure chamber adapted for receiving the material to be comminuted, means for supplying gas under high pressure to said chamber, a receiver for suspended product disposed beneath said high-pressure chamber, said chamber having an outlet passageway of not less than 0.5 mm. in cross section means in said passageway closing the same and adapted to open by a predetermined pressure built up in said chamber, and a spiral tube situated in said receiver and connected to sad passageway for receiving suspended product produced by extrusion of the product through the passageway by the pressure of the gas, said spiral tube serving for separating the suspended product from the gas.

2. A device as claimed in claim 1, wherein said means in said passageway closing the same comprises a membrance which breaks under the predetermined pressure of the gas built up in the chamber.